Figure 1:
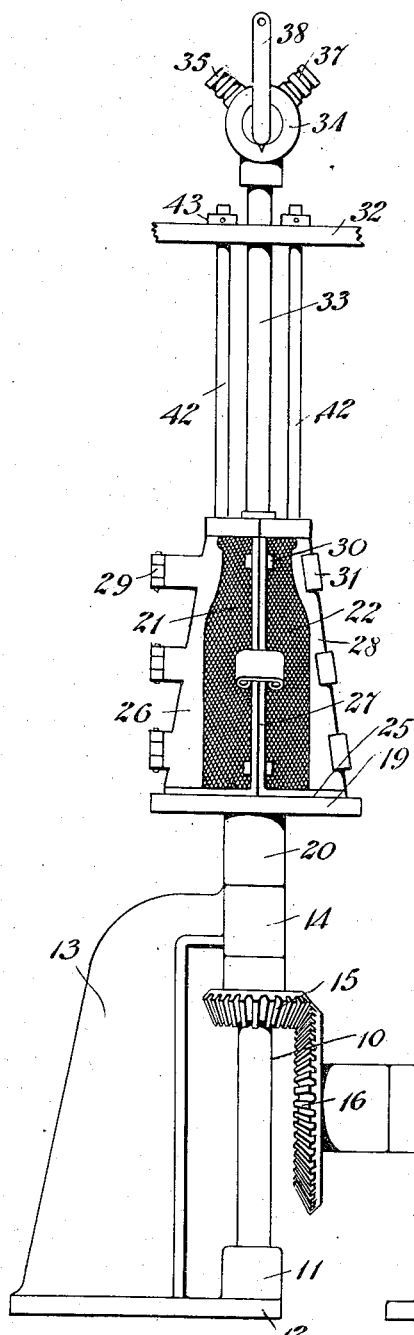

E. A. CLAUS.
PROCESS OF AND APPARATUS FOR MAKING RECEPTACLES.
APPLICATION FILED JAN. 26, 1914.

1,136,775.

Patented Apr. 20, 1915.

WITNESSES
Frank C. Palmer
John K. Brachvogel

INVENTOR
Emil A. Claus
BY
ATTORNEYS

UNITED STATES PATENT OFFICE.

EMIL A. CLAUS, OF NEW YORK, N. Y.

PROCESS OF AND APPARATUS FOR MAKING RECEPTACLES.

1,136,775. Specification of Letters Patent. Patented Apr. 20, 1915.

Application filed January 26, 1914. Serial No. 814,526.

*To all whom it may concern:*

Be it known that I, EMIL A. CLAUS, a citizen of the United States, and a resident of the city of New York, borough of Brooklyn, in the county of Kings and State of New York, have invented a new and Improved Process of and Apparatus for Making Receptacles, of which the following is a full, clear, and exact description.

This invention relates to a process of making receptacles such as milk bottles and the like, and has reference more particularly to a process of this kind, which consists in introducing plastic material into a mold, in causing the viscous material to be spread upon the inner surface of the mold, and in introducing fluid under pressure into the mold to press the material against the walls of the same.

The invention further resides in a process in which the viscous material is evenly spread upon the walls of the mold, both gravitationally and mechanically.

The invention also consists in the use of fluid under pressure, for example, heated air, to press and dry the material against the mold, to determine the form of the receptacle to be fashioned.

The invention also consists in the provision of apparatus for forming receptacles, which comprises a mold, means for introducing viscous material into the mold, the mold being operable to spread the viscous material gravitationally upon the walls of the mold, and means for mechanically wiping and spreading the viscous material against the walls of the mold.

In addition, the invention resides in the provision of means in said apparatus, for introducing fluid, such for example, as heated air, into the mold, to assist in pressing the material against the walls of the mold, and in drying the same.

The object of the invention is to provide a simple, inexpensive and efficient process of making receptacles such as milk bottles and the like, from viscous material, such as wood pulp, or cotton pulp, by means of which the receptacles can be rapidly produced, which does not require elaborate, complicated or costly machinery or apparatus, which does not necessitate the employment of skilled labor, and by means of which strong, durable and cheap receptacles can be produced.

A further object of the invention is to provide an apparatus for carrying out the above-specified process, which is simple and efficient, and easy of operation.

The invention, with respect to the apparatus, consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 2:
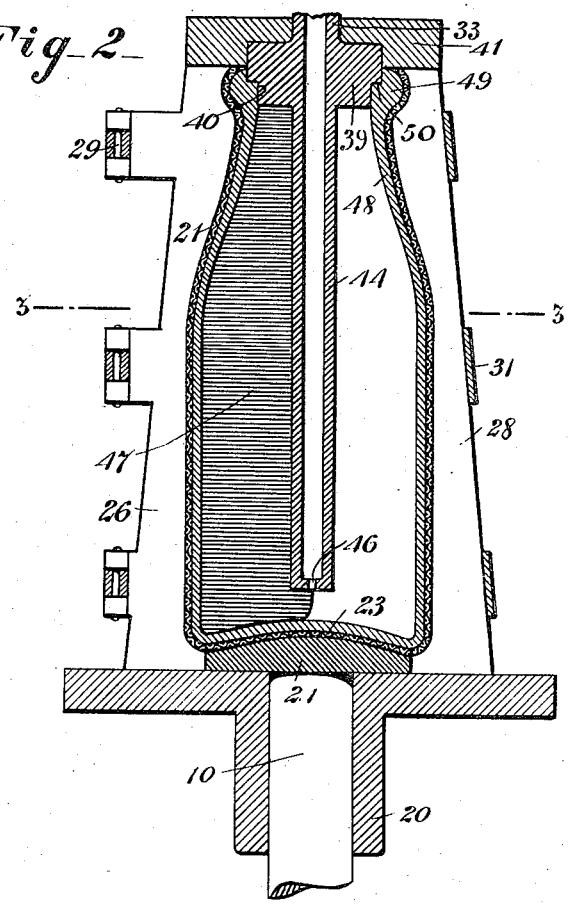
Figure 3:
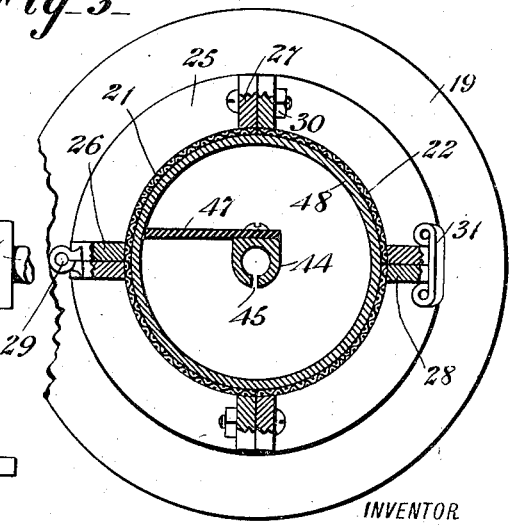

Figure 1 is a side elevation showing an embodiment of the apparatus for carrying out the process constituting my invention; Fig. 2 is an enlarged, vertical section of a part of the apparatus, showing the mold for forming the receptacle; and Fig. 3 is a transverse section on the line 3—3 of Fig. 2.

Before proceeding to a more detailed explanation of my invention, it should be clearly understood that while the process and apparatus can be used for fashioning receptacles of different kinds, sizes and proportions, I have exemplified herein a process and apparatus for producing milk bottles of the conventional type. It is customary at the present time to vend and distribute milk in bottles of a particular form, and customarily capable of holding one quart or one pint. These bottles are of glass and of substantially cylindrical shape, having large mouths provided with internal, annular shoulders upon which are received stopper disks of paper or the like, wedged into position. I have ascertained that the life of a glass milk bottle of this type is approximately six uses; that is, because of breakage or loss the vender on the average can only make use of a bottle six times. Furthermore, such bottles, if they are used more than once, must be thoroughly cleansed, in order that the contents thereof may be delivered in a completely sanitary condition, and the process of collecting and cleansing the glass bottles is naturally an expensive one. Furthermore, glass bottles of this type are heavy and considerable expense is thereby entailed in the shipping and delivering of milk in such receptacles. I am aware that it is not new to employ milk bottles of paraffined paper or like material, but as far as I know, it has not been possible to produce such bottles cheaply and expeditiously.

Furthermore, the receptacles of this kind do not have the form which the ordinary glass milk bottle today has, and it has been found that this shape is an efficient and economical one.

My invention is particularly useful in that it enables me to produce cheaply and expeditiously a receptacle light in weight, thoroughly impervious to moisture, and which has approximately those particular forms and proportions.

It should be understood however, that I do not limit my invention to the production of milk bottles or receptacles having any predetermined shape or size.

Referring more particularly to the drawings, I have exemplified apparatus by means of which a milk bottle can be very readily fashioned from viscous material such as wood or cotton pulp used in the manufacture of paper. I do not wish to limit myself to the particular material however, and any semi-fluid material adapted subsequently to harden, which lends itself to the purpose, can be employed. In Fig. 1 is shown substantially an entire apparatus designed for my process. This includes a vertical shaft 10 having its lower end supported in a bearing 11 mounted on a suitable base 12. Upon the latter is carried an upwardly extending standard 13 having the upper end offset and provided with a bearing 14 in which is received the shaft 10. The latter carries a beveled gear 15 meshing with a second beveled gear 16 secured upon a drive shaft 17 mounted in a bearing 18. The drive shaft 17 is actuated in any suitable manner from a source of power (not shown).

Rigidly secured upon the shaft 10 above the bearing 14, is a revoluble table 19, which has a downwardly extending sleeve 20 seating upon the upper end of the bearing 14. The table 19 serves to support the mold, which consists of sections 21 and 22 forming together a mold approximating the shape of the ordinary milk bottle, as will readily be seen from an inspection of Fig. 2. The mold sections are fashioned from suitable reticulate material such as a fine mesh screen. The base of the mold is likewise fashioned from a convex, circular section of screen 23, mounted upon a suitably formed block 24 positioned upon the table 19. Each section of the mold is secured within a frame comprising semi-annular parts 25 and uprights 26, 27 and 28. The adjacent uprights 26 are secured together by means of hinges 29, so that the frame sections can be opened and closed, to permit the finished article to be removed. The adjacent uprights 27 may be integral, or as shown for example herewith, secured together by means of bolts 30. The uprights 28, which are diametrically opposite to the hinged uprights 26, are preferably fastened together by means of clips or catches 31. It will be readily understood that when the clips or catches 31 are removed, the hollow sections can be swung open, and can subsequently be closed and again secured together by means of the clips. The base portion 23 of the mold of course does not alter its position when the mold is opened or closed.

Positioned a substantial distance directly above the mold sections is a support 32 provided with an opening through which extends movably, a pipe 33. At the upper end of this pipe is located a double valve 34 having an inlet 35 adapted to communicate with the viscous material supply, and an inlet 37 adapted to communicate with a source of heated fluid, such as air preheated and under compression. The double valve is provided with a handle 38 so that it can be manipulated to permit the entrance of pulp or of air into the pipe 33. The latter extends downwardly into the mold and is provided with a head 39 adapted to be received within the mold, and having an annular, contracted part 40 for a purpose to appear hereinafter. Associated with the head is a disk 41 arranged to rest upon the top of the mold sections and the frames, and having secured thereto a pair of guide rods 42 slidably received within suitable openings of the support 32. At the upper ends, the rods have rigidly fastened thereto collars 43 which rest upon the support as is shown in Fig. 1, when the pipe 33 and its associated parts are in their lowermost positions.

Beyond the head 39 the pipe is extended to form an elongated nozzle 44 which, when the pipe is in its depressed position extends into the mold nearly to the bottom thereof. The nozzle has a slot 45 extending along its entire length, and having a part 46 extending across the bottom of the nozzle, which is closed. Secured to the nozzle is a wiper 47 consisting of a plate or sheet of material such as soft rubber, having its outer and lower edge corresponding to the inner outline of the bottle or other receptacle to be formed. The parts are so proportioned that the distance between the outer and lower edges of the wiper and the inner wall and the bottom of the mold corresponds to the thickness of the wall and bottom of the molded article.

The carrying out of my process by means of the above-described operation is as follows: The mold sections are closed, and secured together by means of the clips 31. The valve 34 is operated to permit wood pulp or other viscous material to enter preferably under pressure through the inlet 35. At the same time the shaft 17 is driven to cause the shaft 10 to rotate rapidly, and with it the mold. The plastic material is thrown against the mold through the slot 45 of the nozzle 44 by the pressure feeding the material. It is maintained against the inner walls of the mold by the centrifugal force, and is thereby spread upon the same in an even layer. At the same time, the spreading and uniform disposal of the plastic material is assisted by means of the wiper 47, as the rapidly rotating mold carries the viscous material past the edges of the wiper, as the mold revolves. The amount of material necessary for a single receptacle is of course predetermined, and when the proper quantity has entered the mold, the valve is operated to shut off the flow, and to open the inlet 39. Fluid, such as air under pressure thereupon enters the mold and further presses and flattens the viscous material against the walls of the same. Preferably, the air is heated in order to facilitate the drying of the paper pulp or other material.
The mold may continue to revolve or may be brought to a stop during the introduction of the air under pressure. This pressure need not be a very high one, and I have found that one or two pounds to the square inch will under ordinary circumstances, answer the purpose. Even if the viscous material is discharged gravitationally on to the bottom of the mold, the mold rotating rapidly will force the mass at the bottom to move toward the lateral surface and the centrifugal force will cause the mass at the bottom to rise on the lateral surface of the mold, due to the fact that the lateral surface of the mold decreases in diameter from the bottom toward the top, as can be easily seen from Fig. 2, the wiper facilitating the rise and even distribution of the material during the rotation of the mold. It furthermore serves as a smoother for the inner surface of the bottle formed.

After the article has been molded and compacted against the sides of the mold, centrifugally and mechanically, as above described, and, if necessary, has been partially dried by the heated air, the nozzle and wiper are withdrawn. It will be seen that the head 39 is so formed that the bottle 48 is provided at the inside of the neck 49, with a shoulder 50 adapted for the reception of a closing disk of paper or other material. As the pipe 33 is moved upward, the nozzle is withdrawn from the formed receptacle, and with it the wiper 47. As the latter is of soft material it will readily be displaced or distorted, and can pass through the constricted opening at the mouth of the bottle, without tearing or otherwise injuring the same. The mold sections can then be opened and the receptacle removed and placed in a drier, or permitted to dry at atmospheric temperature, and then rendered moistureproof. It will be readily understood that the duration of the operation or of the different phases thereof will depend to a certain extent upon the character of the material used and the temperature and pressure of the fluid introduced into the mold. These and others of the details form no part of my invention, and can be varied in accordance with individual preference and special conditions. The use of a perforated or reticulate mold is an important part of my invention in that it enables the moisture in the plastic material used, to escape readily through the interstices of the mold. It will of course be understood that these are so proportioned that the plastic material itself will not escape, and will permit its being spread upon the inner walls of the mold in an even, compact and uniform layer. For this reason too, it is inadvisable to employ the heated fluid under a heavy pressure, as it might tend to force the material into and through the perforations in the screen.

Having thus described my invention, I claim as new and desire to secure by Letters Patent:—

1. The process of making receptacles, which consists in introducing viscous material into a mold, in causing the material to be spread upon the inner surface of said mold, in mechanically wiping the material into a thin layer upon the inner surface of said mold, and in introducing fluid under pressure into said mold to press the material against the walls thereof and to dry the same.

2. The process of making receptacles, which consists in introducing viscous material into a perforated mold, in causing the material to be spread upon the inner surface of said mold, by centrifugal action, and in mechanically wiping the material into a thin layer upon the inner surface of said mold, and in introducing fluid under pressure into said mold, to press the material against the walls thereof.

3. The process of making receptacles, which consists in introducing viscous material into a mold, and in spreading the material upon the walls of the mold by mechanically wiping the same against the walls of said mold and by means of fluid under pressure.

4. The process of making receptacles, which consists in introducing viscous material into a perforate mold, in causing the material to be spread upon the inner surface of said mold, by rotating said mold, in mechanically wiping the material into a thin layer upon the inner surface of said mold, and in introducing heated fluid under pressure into said mold to press the material against the walls thereof.

5. Apparatus of the class described, comprising a rotary mold, means for introducing viscous material into said mold, flexible means for wiping said material into a thin layer upon the inner walls of said mold, and means for introducing fluid under pressure into said mold.

6. Apparatus of the class described, comprising a sectional mold, means for rotating said mold, a nozzle normally projecting into said mold and removable therefrom, a flexible wiper associated with said nozzle, and means for introducing viscous material and fluid under pressure into said mold, through said nozzle.

7. Apparatus of the class described, comprising a mold having side sections and a bottom, and adapted to be opened to permit the removal of molded articles, means for rotating said mold, a nozzle normally projecting into said mold and having a slot extending longitudinally thereof, a flexible wiper associated with said nozzle, and means for successively introducing into said mold, through said nozzle, viscous material and fluid under pressure.

8. In apparatus of the class described, a mold, and a wiper having the edges thereof conforming substantially to the inner outline of said mold, and fashioned from flexible material.

9. In apparatus of the class described, a mold having a reduced opening, a removable nozzle projecting into said mold through said opening, and a wiper associated with said nozzle and fashioned from material such that it can be withdrawn through the opening of the molded article, with said nozzle, without danger of injury to the molded article.

10. In apparatus of the class described, a wiper consisting of a sheet of soft rubber.

11. Apparatus of the class described comprising a mold having longitudinal sections and a bottom, means for opening and closing said sections whereby a molded article can be removed, means for rotating said mold, a nozzle normally projecting into said mold and having a slot extending longitudinally thereof, said nozzle having a head adapted to be engaged by said longitudinal section and therewith shape the top of the receptacle, a wiper associated with said nozzle and means for successively introducing into said mold viscous material and fluid under pressure.

12. Apparatus of the class described comprising a mold having longitudinal sections and a bottom, said longitudinal sections having a top integral therewith, lateral means for said sections permitting the removal of molded articles, means for rotating said mold, a nozzle normally projecting into said mold and having a head extending laterally thereof, said nozzle having a head adapted to be engaged by the top of said longitudinal section whereby said nozzle is locked in position, a wiper associated with said nozzle, and means for successively introducing into said mold through said nozzle viscous material and fluid under pressure, said head of the nozzle being adapted to co-act with said longitudinal section and form the mouth of the article to be molded.

13. The process of making receptacles, which consists in introducing viscous material into a mold, in causing the material to be spread upon the inner surface of said mold by centrifugal action, in mechanically wiping the material into a thin layer upon the inner surface of said mold, and in introducing fluid under pressure into said mold.

14. Apparatus of the class described comprising a mold having a reduced opening, a nozzle for said mold, and a wiper associated with said nozzle and fashioned from flexible material that can be withdrawn through the opening of the molded article without danger of injury to the molded article.

15. The process of making receptacles, which consists in introducing viscous material into a mold and in simultaneously spreading, wiping and supplying heat to the said material in the mold.

16. The process of making receptacles, which consists in introducing viscous material into a mold and in simultaneously, centrifugally and mechanically spreading said material, wiping it smooth and drying the same in the mold, the drying being done by a heated fluid.

In testimony whereof I have hereunto signed my name to this specification in the presence of two subscribing witnesses.

EMIL A. CLAUS.

Witnesses:
 JOHN K. BRACHVOGEL,
 GEORGE H. EMSLIE.